(12) United States Patent
Oh et al.

(10) Patent No.: US 9,249,022 B2
(45) Date of Patent: Feb. 2, 2016

(54) GRAPHENE-CARBON NANOTUBE NANOSTRUCTURE AND METHOD OF MANUFACTURING SAME

(71) Applicant: Korea Advanced Institute of Science and Technology, Daejeon (KR)

(72) Inventors: Il-Kwon Oh, Daejeon (KR); Vadahanambi Sridhar, Daejeon (KR); Hyun-Jun Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/352,640

(22) PCT Filed: Oct. 16, 2012

(86) PCT No.: PCT/KR2012/008432
§ 371 (c)(1),
(2) Date: Apr. 17, 2014

(87) PCT Pub. No.: WO2013/058517
PCT Pub. Date: Apr. 25, 2013

(65) Prior Publication Data
US 2014/0248207 A1  Sep. 4, 2014

(30) Foreign Application Priority Data

Oct. 19, 2011 (KR) .................... 10-2011-0107171

(51) Int. Cl.
*C01B 31/02* (2006.01)
*C01B 31/00* (2006.01)
*B01J 19/12* (2006.01)
(Continued)

(52) U.S. Cl.
CPC ............. *C01B 31/00* (2013.01); *B01J 19/12* (2013.01); *B82Y 30/00* (2013.01); *B82Y 40/00* (2013.01); *C01B 31/0226* (2013.01); *C01B 31/0446* (2013.01); *C01B 2202/22* (2013.01); *C01B 2204/22* (2013.01); *Y10S 977/742* (2013.01); *Y10S 977/847* (2013.01); *Y10S 977/932* (2013.01)

(58) Field of Classification Search
CPC ...... C01B 31/02; C01B 31/022; C01B 31/04; F05C 2203/0808; B01J 19/12; B82Y 40/00; B82B 3/00
USPC ........... 423/445 B, 445 R, 460, 447.1, 447.3, 423/448
See application file for complete search history.

(56) References Cited

U.S. PATENT DOCUMENTS

2010/0222211 A1* 9/2010 Drzal et al. .................. 502/184

FOREIGN PATENT DOCUMENTS

| KR | 10-2011-0032999 A | 3/2011 |
| KR | 10-2013-0079144 A | 7/2013 |

OTHER PUBLICATIONS

Machine English translation of KR1020110032999.*
(Continued)

*Primary Examiner* — Richard M Rump
(74) *Attorney, Agent, or Firm* — McDermott Will & Emery LLP

(57) ABSTRACT

Disclosed are a method of manufacturing a graphene-carbon nanotube nanostructure which includes mixing graphite, a catalytic metal, and an ionic liquid, and then radiating microwaves on the mixture, and a graphene-carbon nanotube nanostructure manufactured using the method.

12 Claims, 2 Drawing Sheets

(51) Int. Cl.
  *B82Y 40/00* (2011.01)
  *B82Y 30/00* (2011.01)
  *C01B 31/04* (2006.01)

(56) References Cited

OTHER PUBLICATIONS

Janowska, Izabela, et al. "Microwave synthesis of large few-layer graphene sheets in aqueous solution of ammonia." Nano Research 3.2 (2010): 126-137.*

Lu, Jiong, et al. "One-pot synthesis of fluorescent carbon nanoribbons, nanoparticles, and graphene by the exfoliation of graphite in ionic liquids." ACS nano 3.8 (2009): 2367-2375.*

Sun Hwa Lee, et al., "Tailored Assembly of Carbon Nanotubes and Graphene," Advanced Functional Materials, 2011, vol. 21, pp. 1338-1354.

Guoqing Xin, et al., "A graphene sheet exfoliated with microwave irradiation and interlinked by carbon nanotubes for high-performance transparent flexible electrodes," Nanotechnology 21 (2010) 405201 (7pp).

Dingshan Yu, et al., "Self-Assembled Graphene/Carbon Nanotube Hybrid Films for Supercapacitors," The Journal of Physical Chemistry Letters, 2010, 1, 467-470.

Xiaochen Dong, et al., "One-step growth of graphene-carbon nanotube hybrid materials by chemical vapor deposition," Carbon 49 (2011) 2944-2949.

* cited by examiner

GRAPHENE-CARBON NANOTUBE NANOSTRUCTURE AND METHOD OF MANUFACTURING SAME

BACKGROUND OF THE INVENTION (a) Field of the Invention

A graphene-carbon nanotube nanostructure and a method of manufacturing the same are disclosed.

(b) Description of the Related Art

In general, various electronic devices such as a display device, a light emitting diode, a solar cell, and the like transmit light and display an image or generate electricity, and thus require a transparent conductive layer for transmitting the light. This transparent conductive layer is widely formed by using indium tin oxide (ITO).

However, since the indium tin oxide becomes expensive and less economical due to increasing consumption of indium, and particularly, the transparent conductive layer including the indium has a chemical and electrical defect, a transparent conducting material for replacing the indium tin oxide is required.

As for this transparent conducting material, carbon nanotubes are being researched. Carbon nanotubes are a carbon material having a diameter of several nanometers and thus have high conductivity.

The carbon nanotubes may be formed in a chemical vapor deposition (CVD) method. For example, the carbon nanotubes may be vertically raised by supplying a carbon source gas to a substrate on which a metal catalyst is dispersed, and then heat-treating it at a high temperature.

However, the chemical vapor deposition method of raising the carbon nanotubes requires a high temperature of greater than or equal to about 500° C., and thus may require a complicated process and a higher cost as well as including a limited kind of substrate.

TECHNICAL OBJECT

One embodiment provides a graphene-carbon nanotube nanostructure capable of being mass-produced by simplifying a manufacturing process and thus decreasing its production time and cost.

Another embodiment provides a method of manufacturing the graphene-carbon nanotube nanostructure.

TECHNICAL SOLUTION

According to one embodiment, a method of manufacturing a graphene-carbon nanotube nanostructure which includes mixing graphite, a catalytic metal, and an ionic liquid, and radiating a microwave to the mixture, is provided.

The catalytic metal may include palladium (Pd), nickel (Ni), cobalt (Co), iron (Fe), or a combination thereof.

The manufacturing method may further include grinding the catalytic metal before preparing the mixture.

The ground catalytic metal may have a particle size of about 10 nm to 100 nm.

The ionic liquid may include at least one of a 1-ethyl-3-methylimidazolium (EMIM)-based ionic liquid and a 1-butyl-3-methylimidazolium (BMIM)-based ionic liquid.

The 1-ethyl-3-methylimidazolium (EMIM)-based ionic liquid may include 1-ethyl-3-methylimidazolium tetrafluoroborate, 1-ethyl-3-methylimidazolium hexafluorophosphate, 1-ethyl-3-methylimidazolium chloride, 1-ethyl-3-methylimidazolium trifluoroethane sulfonate, and 1-ethyl-3-methylimidazolium bis[(trifluoromethyl)sulfonyl]imide, and the 1-butyl-3-methylimidazolium (BMIM)-based ionic liquid may include 1-butyl-3-methylimidazolium tetrafluoroborate, 1-butyl-3-methylimidazolium hexafluorophosphate, 1-butyl-3-methylimidazolium chloride, 1-butyl-3-methylimidazolium trifluoroethane sulfonate, and 1-butyl-3-methylimidazolium bis[(trifluoromethyl)sulfonyl]imide.

The graphite and the catalytic metal may be included in a ratio of about 1:0.05 to 1:1.

Specifically, the graphite and the ionic liquid may be included in a ratio of about 1:0.1 to 1:1.

The graphite, the catalytic metal, and the ionic liquid may be included in a ratio of about 1:0.2:0.5.

The mixture may be obtained by mixing the catalytic metal and the ionic liquid and then adding the graphite thereto.

The manufacturing method may further include ultrasonication after performing at least one of mixing the catalytic metal with the ionic liquid and adding the graphite to the mixture.

When the mixture is radiated by microwaves, the graphite expands in volume and forms graphene, and carbon nanotubes grow by using the metal as a catalyst.

The microwave may be radiated with an intensity of about 100 to about 2000 W.

The microwave may be radiated for about 1 to 1000 seconds.

According to another embodiment, a graphene-carbon nanotube nanostructure manufactured in the aforementioned method is provided.

The graphene-carbon nanotube nanostructure may have a shape of which linear carbon nanotubes grow on a plane graphene.

Advantageous Effect

A graphene-carbon nanotube nanostructure may be massively produced by simplifying a manufacturing process and decreasing its production time and cost.

DETAILED DESCRIPTION

Figure 1:
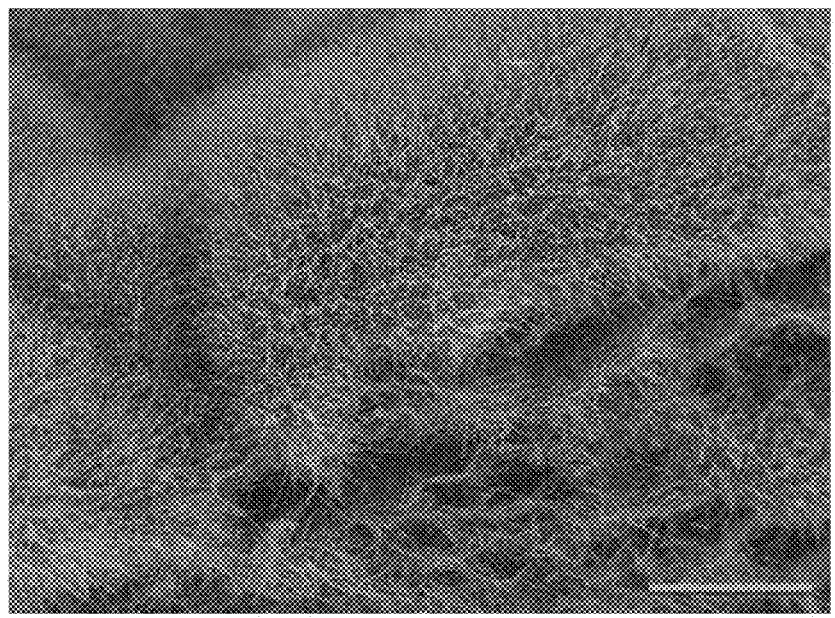
FIGS. 1 to 3 are scanning electron microscope (SEM) photographs respectively showing 4 μm, 400 nm, and 100 nm magnifications of a graphene-carbon nanotube nanostructure according to an example.

Exemplary embodiments of the present invention will hereinafter be described in detail, and may be easily performed by those who have common knowledge in the related art. However, this disclosure may be embodied in many different forms and is not to be construed as limited to the exemplary embodiments set forth herein.

A method of manufacturing a graphene-carbon nanotube nanostructure according to one embodiment includes mixing graphite, a catalytic metal, and an ionic liquid, and then radiating microwaves to the mixture.

The graphite plays a role of being a carbon source forming carbon nanotubes and graphene, and may be expandable by microwave radiation, which will be described later.

The catalytic metal may play a role of a seed for raising the carbon nanotubes.

The catalytic metal may be palladium (Pd), nickel (Ni), cobalt (Co), iron (Fe), or a combination thereof. For example, the catalytic metal may be a single metal such as palladium (Pd), nickel (Ni), cobalt (Co), and iron (Fe), or an alloy such as palladium (Pd)-nickel (Ni), palladium (Pd)-cobalt (Co), nickel (Ni)-cobalt (Co), nickel (Ni)-iron (Fe), palladium (Pd)-iron (Fe), cobalt (Co)-iron (Fe), palladium (Pd)-nickel (Ni)-cobalt (Co), palladium (Pd)-nickel (Ni)-iron (Fe), palladium (Pd)-cobalt (Co)-iron (Fe), nickel (Ni)-cobalt (Co)-iron (Fe), or palladium (Pd)-nickel (Ni)-cobalt (Co)-iron (Fe).

The catalytic metal may be a powder, and the powder may be further minutely ground before preparing the mixture.

The ground catalytic metal may have a particle size of about 10 nm to 100 nm, and the particle size of the catalytic metal may determine diameter of the carbon nanotubes.

Density of the carbon nanotube may be adjusted depending on the amount of the catalytic metal. In other words, the more the catalytic metal is included, the higher the density the carbon nanotubes may have, while the less the catalytic metal is included, the lower the density the carbon nanotubes may have.

The ionic liquid is an ionic salt compound including cations and anions, and may be present as a liquid at room temperature. The ionic liquid may prevent agglomeration of the catalytic metal and uniformly disperse the catalytic metal, and thus uniformly raise the carbon nanotubes.

The ionic liquid may include a 1-ethyl-3-methylimidazolium (EMIM)-based ionic liquid and/or a 1-butyl-3-methylimidazolium (BMIM)-based ionic liquid.

Examples of the 1-ethyl-3-methylimidazolium (EMIM)-based ionic liquid may include 1-ethyl-3-methylimidazolium tetrafluoroborate, 1-ethyl-3-methylimidazolium hexafluorophosphate, 1-ethyl-3-methylimidazolium chloride, 1-ethyl-3-methylimidazolium trifluoroethane sulfonate, and 1-ethyl-3-methylimidazolium bis[(trifluoromethyl)sulfonyl]imide.

Examples of the 1-butyl-3-methylimidazolium (BMIM)-based ionic liquid may include 1-butyl-3-methylimidazolium tetrafluoroborate, 1-butyl-3-methylimidazolium hexafluorophosphate, 1-butyl-3-methylimidazolium chloride, 1-butyl-3-methylimidazolium trifluoroethane sulfonate, and 1-butyl-3-methylimidazolium bis[(trifluoromethyl)sulfonyl]imide.

The graphite and the catalytic metal may be included in a ratio of about 1:0.05 to about 1:1. Specifically, the graphite and the catalytic metal may be included in an amount of about 1:0.1 to about 1:0.5 within the range. When the graphite and the catalytic metal are included within the range, density of the carbon nanotubes may be adjusted by controlling radiation time of microwaves.

The graphite and the ionic liquid may be included in a ratio of about 1:0.1 to about 1:1. Specifically, the graphite and the ionic liquid may be included in a ratio of about 1:0.4 to about 1:0.5 within the range. When the graphite and the ionic liquid are included within the range, the graphite expands up to a desired volume and provides an appropriate environment for carbon nanotube growth.

The graphite, the catalytic metal, and the ionic liquid may be included, for example, in a ratio of about 1:0.2:0.5.

The mixture may be prepared by mixing the catalytic metal with the ionic liquid and then adding the graphite thereto.

Herein, the mixture may be ultrasonicated after mixing the catalytic metal with the ionic liquid. The ultrasonication may further grind the catalytic metal into minute particles and uniformly disperse the catalytic metal into the ionic liquid.

In addition, the ultrasonication may be performed after adding the graphite to the mixture. The ultrasonication may uniformly mix the catalytic metal, the ionic liquid, and the graphite.

The microwave radiation of the mixture may be performed with an intensity of about 100 to 2000 W for about 1 to 1000 seconds. When the microwave radiation is performed within the range, the carbon nanotubes may be raised to have a desired length and density.

In the microwave radiation, the graphite may expand in volume and form plane graphene, and a linear carbon nanotube may grow in place of the catalytic metal. Accordingly, a one dimensional carbon nanotube grows in a vertical direction on two dimensional graphene, forming a three dimensional nanostructure.

The graphene-carbon nanotube nanostructure formed in the above method may include a plane graphene having an area of about 1 $nm^2$ to about 2500 $nm^2$ and a linear carbon nanotube having a width of about 10 nm to 100 nm and a length of about 10 nm to 10 μm. However, the area of the graphene and the width/length of the carbon nanotube may vary depending on an expansion degree of the graphite and other process conditions.

The graphene-carbon nanotube nanostructure may have excellent electrical characteristics, that is, high conductivity and low contact resistance, as well as high light transmittance. Accordingly, the graphene-carbon nanotube nanostructure may be used as a transparent conductive layer such as a transparent electrode in various electronic devices or as a semiconductor if necessary.

The electronic device is a device including a transparent conductive layer without a particular limit, and may include, for example, a liquid crystal display, an organic light emitting diode, an electronic paper display device, a solar cell, an image sensor, and the like.

Hereinafter, the present disclosure is illustrated in more detail with reference to examples. However, these examples are exemplary, and the present disclosure is not limited thereto.

EXAMPLE

Graphite, a palladium (Pd) powder, and 1-ethyl-3-methylimidazolium tetrafluoroborate (EMIM-$BF_4$) were prepared in a weight ratio of 1:0.2:0.5. Firstly, the palladium (Pd) powder and the 1-ethyl-3-methylimidazolium tetrafluoroborate (EMIM-$BF_4$) were mixed by using an ultrasonic wave grinder. Subsequently, the graphite was added to the mixture, and the obtained mixture was uniformly mixed by using an ultrasonic wave decomposer. The mixture of the graphite, the palladium (Pd) powder, and the 1-ethyl-3-methylimidazolium tetrafluoroborate (EMIM-$BF_4$) was then put in a 700 W microwave (MAS-II, Microwave Synthesis System) and radiated by microwaves for 90 seconds, obtaining a graphene-carbon nanotube nanostructure.

Examination of Graphene-Carbon Nanotube Nanostructure

The graphene-carbon nanotube nanostructure according to the example was examined.

Figure 2:
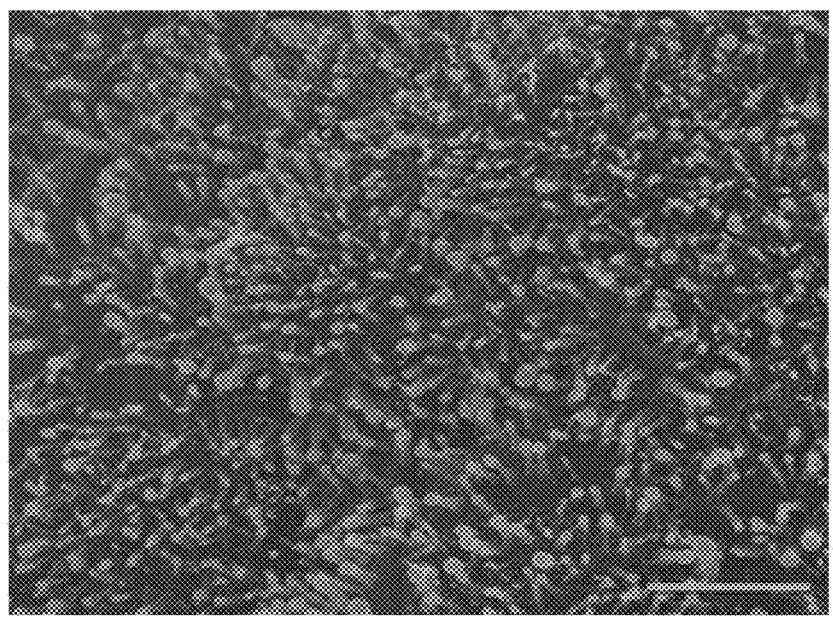
Figure 3:
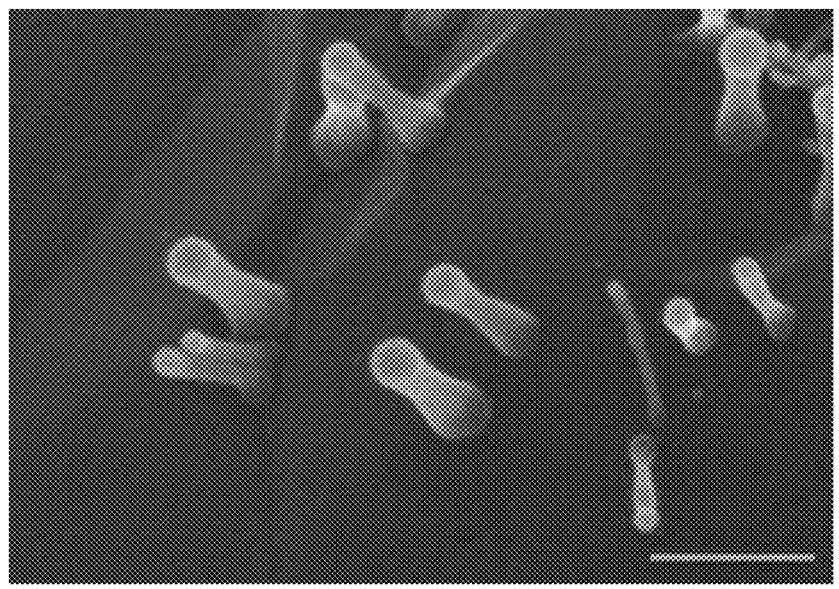
Figure 4:
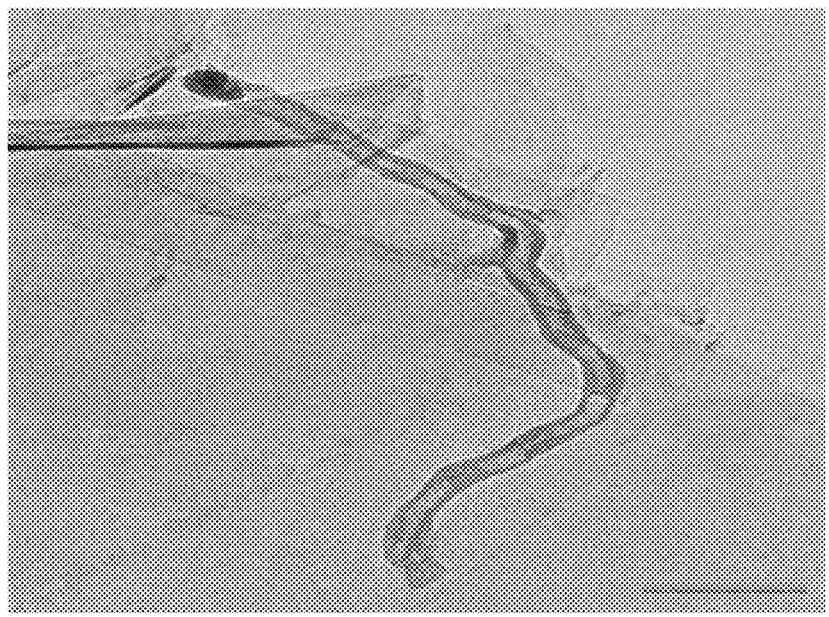
FIG. 4 is a transmission electron microscope (TEM) photograph showing the graphene-carbon nanotube nanostructure of the example.

FIGS. 1 to 3 are scanning electron microscope (SEM) photographs respectively showing 4 μm, 400 nm, and 100 nm magnifications of the graphene-carbon nanotube nanostructure according to the example, and FIG. 4 is a transmission electron microscope (TEM) photograph showing the graphene-carbon nanotube nanostructure according to the example.

Referring to FIGS. 1 to 3, the graphene-carbon nanotube nanostructure of the example shows multiple carbon nanotubes protruded on plane graphene.

Referring to FIG. 4, the graphene-carbon nanotube nanostructure of the example was transparent.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a graphene-carbon nanotube nanostructure, comprising:
mixing materials consisting of graphite, a catalytic metal, and an ionic liquid, the graphite and the catalytic metal being included in a ratio of 1:0.05 to 1:1, and
radiating microwaves to the mixture,
wherein in the microwave radiation on the mixture, the graphite expands in volume and forms graphene, and carbon nanotubes grow in place of the catalytic metal.

2. The method of claim 1, wherein the catalytic metal comprises palladium (Pd), nickel (Ni), cobalt (Co), iron (Fe), or a combination thereof.

3. The method of claim 1, further comprising grinding the catalytic metal before mixing the graphite, the catalytic metal, and the ionic liquid.

4. The method of claim 3, wherein the ground catalytic metal has a particle size ranging from about 10 nm to 100 nm.

5. The method of claim 1, wherein the ionic liquid comprises at least one of a 1-ethyl-3-methylimidazolium (EMIM)-based ionic liquid and a 1-butyl-3-methylimidazolium (BMIM)-based ionic liquid.

6. The method of claim 5, wherein the 1-ethyl-3-methylimidazolium (EMIM)-based ionic liquid comprises 1-ethyl-3-methylimidazolium tetrafluoroborate, 1-ethyl-3-methylimidazolium hexafluorophosphate, 1-ethyl-3-methylimidazolium chloride, 1-ethyl-3-methylimidazolium trifluoroethane sulfonate, and 1-ethyl-3-methylimidazolium bis[(trifluoromethyl)sulfonyl]imide, and
the 1-butyl-3-methylimidazolium (BMIM)-based ionic liquid comprises 1-butyl-3-methylimidazolium tetrafluoroborate, 1-butyl-3-methylimidazolium hexafluorophosphate, 1-butyl-3-methylimidazolium chloride, 1-butyl-3-methylimidazolium trifluoroethane sulfonate, and 1-butyl-3-methylimidazolium bis[(trifluoromethyl)sulfonyl]imide.

7. The method of claim 1, wherein the graphite and the ionic liquid are included in a ratio of 1:0.1 to 1:1.

8. The method of claim 1, wherein the graphite, the catalytic metal and the ionic liquid are included in a ratio of 1:0.2:0.5.

9. The method of claim 1, wherein the mixture is prepared by mixing the catalytic metal and the ionic liquid, and then adding the graphite thereto.

10. The method of claim 9, further comprising ultrasonication after performing at least one of mixing the catalytic metal and the ionic liquid and adding the graphite thereto.

11. The method of claim 1, wherein the microwave radiation on the mixture is performed by radiating microwaves with an intensity of 100 to 2000 W.

12. The method of claim 11, wherein the microwave radiation on the mixture is performed by radiating microwaves for 1 to 1000 seconds.

* * * * *